Nov. 3, 1964  R. K. MUKHERJEE  3,154,962
AUTOMATIC GEAR MECHANISMS
Filed June 15, 1962  2 Sheets-Sheet 1

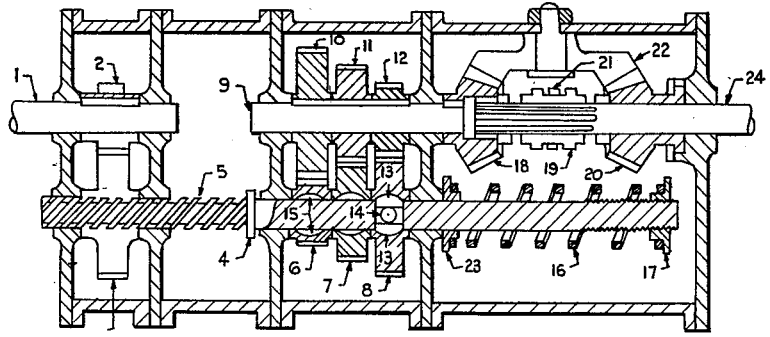
FIG. 4.
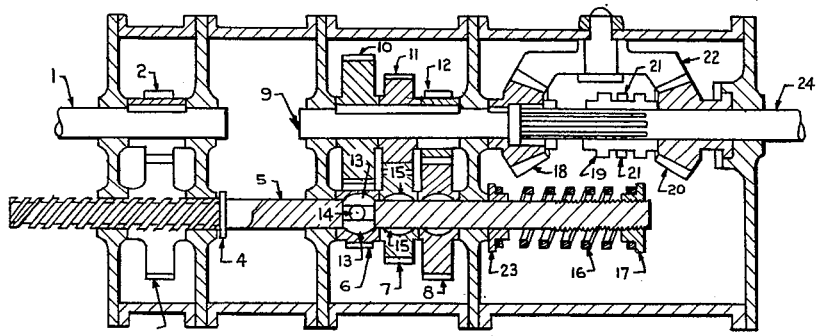
FIG. 5.
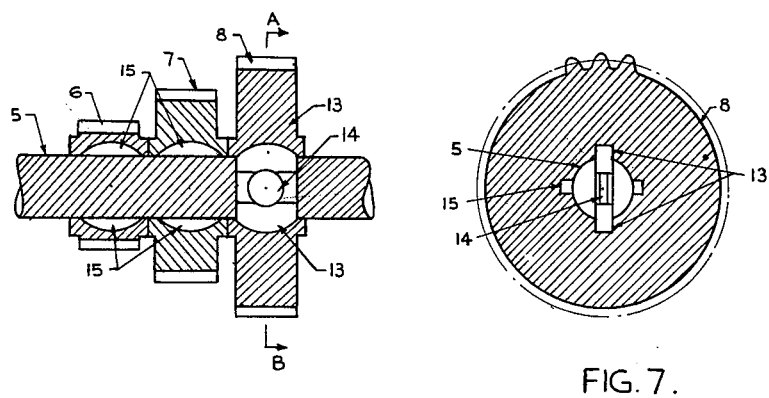
FIG. 6.
FIG. 7.

United States Patent Office 3,154,962
Patented Nov. 3, 1964

3,154,962
AUTOMATIC GEAR MECHANISMS
Ram Krishna Mukherjee, 2 Raja Peary Mohan Road, Uttarpara, Dist. Hooghly, West Bengal, India
Filed June 15, 1962, Ser. No. 202,809
Claims priority, application Great Britain, Feb. 6, 1962, 4,579/62
2 Claims. (Cl. 74—337)

This invention relates to automatic gear mechanisms and in particular to self changing automatic gear mechanisms responsive to the torque of an engine or prime mover.

According to this invention, an automatic gear mechanism is provided with a driving shaft and a driven shaft, said driving shaft being geared to an axially movable intermediate shaft, said intermediate shaft being adapted to be moved in one direction by the torque of the engine against a spring loading and in the other direction by the spring loading against the torque of the engine said intermediate shaft having loosely mounted gears in engagement with corresponding gears on the driven shaft said loosely mounted gears being adapted to be fixed selectively to said intermediate shaft as said intermediate shaft is moved to one side or the other to obtain the most advantageous gear ratio.

Preferably the driving shaft is geared to said intermediate shaft by means of a pinion fixedly mounted on said driving shaft and a gear in mesh with said pinion and mounted on said intermediate shaft, said gear having multiple start internal thread and said intermediate shaft being partly threaded with multiple start external thread in engagement with said internal thread two or more pinions and gears of varying pitch diameters being freely mounted on said intermediate shaft and in constant mesh with another two or more pinions and gears of varying pitch diameters fixedly mounted on a driven shaft, said intermediate shaft having a slot to receive a spring and keys, said spring being adapted to press said keys against corresponding keyways in the hubs of said freely mounted pinions and gears and preferably said keys are semi-circular or segmental and the slot spring is a circular strip spring.

In the accompanying drawings, FIGS. 1–5 show cross-sectional plan views of an automatic gear mechanism in which the first gear of high ratio, second gear of intermediate ratio, third or top gear of equal ratio, neutral and reverse gear are shown in their respective positions.

FIG. 6 shows an enlarged cross-sectional plan view of a part of the intermediate shaft, pinions, gears, keys and keyways.

FIG. 7 shows a cross-sectional end elevation at AB of FIG. 6.

Figure 1:
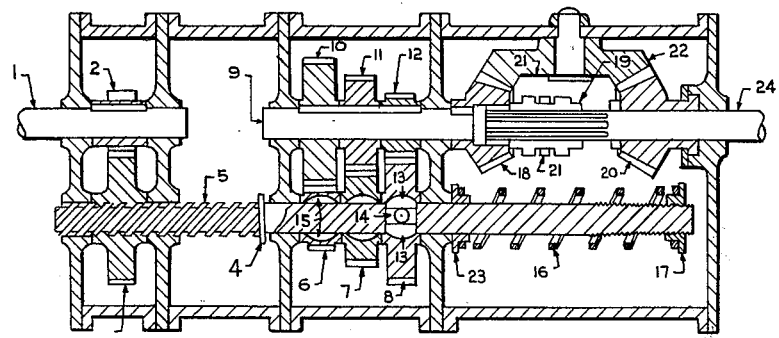

Referring to FIG. 1, pinion 2 is fixed to the driving shaft 1 by means of a key said driving shaft being connected to the engine or prime mover. Said pinion is in engagement with the gear 3, which is mounted on the axially movable shaft 5. Said shaft 5 is partially threaded with multiple start thread, preferably square thread, which is in engagement with similar internal thread in the hub of the gear 3. Gear 3 may preferably be mounted on two thrust ball or taper roller bearings (not shown) as there is considerable side thrust on said gear.

By rotating said driving shaft 1 in clockwise direction viewed from left towards the right in the drawings, said gear 3 will rotate in anti-clockwise direction, which will pull said sliding shaft towards the left. A stop ring 4 restricts movement of said shaft between two predetermined limits. Said sliding shaft 5 is spring loaded at the other end. The spring 16 is compressed against two flanges 17 and 23, of which said flange 17 is screwed on said shaft 5 and said flange 23 is freely mounted on said shaft 5. The compression of said spring 16 may be adjusted by screwing down said flange 17 over said shaft 5. Said flange 23, which is subjected to considerable thrust, should preferably rotate against a thrust ball bearing (not shown). Said shaft is slidable through the bore of said flange 23.

The sliding shaft 5 has a slot cut through an intermediate position, through which two semi-circular or segmental keys 13 are inserted and pressed against a circular strip spring 14 or any other type of spring, and the said keys are adapted to engage corresponding keyways in the hub of the gear 8. All the three freely mounted pinions and gears 6, 7 and 8 have corresponding semi-circular or segmental keyways in the hubs thereof and the keys 13 are capable of locking any one of said pinions or gears with said shaft 5 by axially moving said shaft 5. This is shown more clearly in the enlarged view in FIGURES 6 and 7, in which the pinions and gears 6, 7 and 8 are shown freely mounted on sliding shaft 5, which is axially movable through the bore of the said pinions or gears. There are two or more semi-circular or segmental keyways 15 in the hub of each of the pinions or gears 6, 7 and 8. By pulling said shaft 5 towards the left, said keys 13 will press against the action of the circular strip spring 14 and will disengage gear 8 and lock gear 7 with shaft 5. On further pulling shaft 5 towards the left, gear 7 will be disengaged and pinion 6 will be locked with shaft 5. Due to resistance of spring 14, the movement of shaft 5 will be in small jerks while changing from one gear to another so that neutral position will not be maintained between two adjacent keyways.

Suppose the ratio of pitch diameters of pinion 2 and gear 3 is 1:2 and the ratio of pitch diameters of gear 8 and pinion 12 is 2:1 and gear 8 is locked to the movable shaft 5 by means of keys 13, then the ratio of speed of the driving shaft 1 to the driven shaft 9 will be 1:1 or top gear in engagement.

Figure 2:
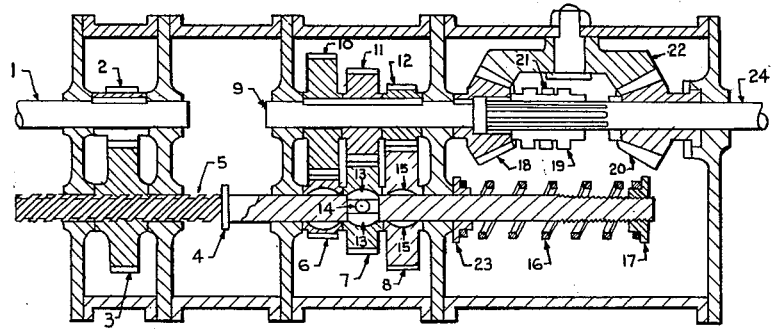
Figure 3:
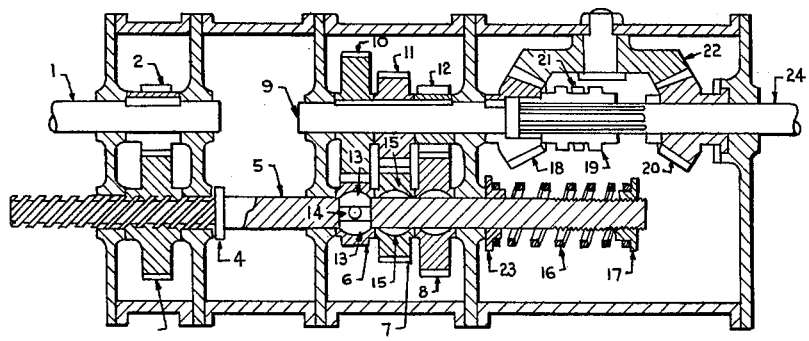

Referring to FIG. 2, taking the ratio of pitch diameters of gear 7 and gear 11 as 1:1, when shaft 5 is shifted towards the left locking gear 7 with shaft 5 by means of keys 13, the ratio of speed of the driving shaft 1 to the driven shaft 9 will be 2:1 or second gear in engagement, and on further moving shaft 5 towards the left as shown in FIG. 3 and locking pinion 6 with shaft 5 and taking the ratio of pitch diameters of pinion 6 to gear 10 as 1:2, the ratio of speed of the driving shaft 1 and the driven shaft 9 will be 4:1 or the first gear in engagement.

When the propeller shaft of an automobile or the shaft of a machine is connected to the driven shaft 24, which is coupled to the driven shaft 9 by means of a dog clutch 19 and the engine of an automobile or a prime mover is connected to the driving shaft 1 through a clutch and the automobile or the machine is at rest, the top gear will remain in engagement due to the action of spring 16 as shown in FIG. 1. On starting the engine or the prime mover, the driving shaft 1 and pinion 2 rotate in clockwise direction and gear 3 in the anti-clockwise direction. As the automobile or the machine is at rest, gear 3 is unable to rotate the driven shaft 24 through the top gear but pulls the shaft 5 towards the left by the multiple start thread against the strong spring 16 and the second gear comes into engagement as shown in FIG. 2.

If the torque on the driven shaft 24 and consequently the torque on the driving shaft 1 is still unable to move the automobile or the machine, shaft 5 is further pulled towards the left against spring 16, which is further compressed, and the first gear comes into engagement as shown in FIG. 3. In this position the pull on shaft 5 and the action of spring 16 in the opposite direction almost balance. This balance position is obtained by previously adjusting the compression of spring 16 by screwing down flange 17. The automobile or the machine will begin to move and gain speed. With increase of speed the torque on the driven shaft 24 and consequently on the driving shaft 1 is gradually reduced and at a certain speed the action of spring 16 is greater than the pull on shaft 5, which is shifted in the opposite direction towards the right and the second gear comes into engagement as shown in FIG. 2. On a further increase of speed and reduction of torque on the driven shaft 24 and on the driving shaft 1, the action of spring 16 being more than the pull on shaft 5, said shaft 5 will move to its original position with top gear in engagement as shown in FIG. 1.

Due to the multiple start thread on shaft 5, the movement of shaft 5 and the change of gear from top to second and from second to first or vice versa is very rapid and on partial rotation of gear 3, a change of gear takes place. When applied to a motor car at rest and the engine of the motor car is running and the clutch is engaged, the gear instantly changes from top to first due to the high starting torque. When the car is in motion in first gear and it becomes necessary to optionally change to second gear, a slight release of pressure on the accelerator will reduce the torque on the driving shaft 1 and the action of the spring 16 will change the gear either to the second or the top depending on the amount of release of pressure on the accelerator. Thus the gears can be changed automatically from first to second or from second to top by continuously pressing the accelerator and speeding the car to reduce torque on the shafts or optionally by slightly releasing the accelerator. When the car is in motion in first or second gear, complete release of the accelerator will have a braking effect due to instantaneous engagement of the top gear and again on pressing the accelerator gears will instantly change from top to second or from second to first gear, which is advantageous in congested streets where the car has to be stopped and started frequently. Gears can be changed at the option of the driver by manipulating the accelerator.

Instead of three gear ratios as described more gear ratios may be added. For instance, a hill climbing gear of higher ratio and an over-drive gear of lower ratio may be conveniently added.

In FIGS. 1 to 3, the driven shafts 9 and 24, which are in two parts, may be directly coupled together by means of the dog clutch 19, which is mounted over splines on the driven shaft 24 and is axially slidable by means of fork 21. Said fork is manually operated by a lever (not shown). For forward motion of the automobile or clockwise motion of the machine, dog clutch 19 engages with the toothed face of the bevel pinion 18 and couples the two driven shafts 9 and 24 together. Said bevel pinion is mounted over the end of the driven shaft 9 fixed to it by means of a key. The driven shaft 24 passes through the bore of the bevel pinion 20, which is freely mounted on the shaft 24. The end of shaft 24 is inserted through the bore of the bevel pinion 18 and is free to rotate in the bore of said pinion. As the two parts of the driven shafts 9 and 24 are coupled together by means of dog clutch 19 for forward or clockwise motion, bevel pinions 18 and 20 and bevel gear 22 remaining idlers.

In FIG. 4, the neutral position, the dog clutch 19 is placed in an intermediate position between the two bevel pinions 18 and 20, without engaging either of them and thereby disconnecting the driven shafts 9 and 24.

In FIG. 5, for reverse motion of the automobile or anti-clockwise motion of the machine, the dog clutch 19 is shifted towards the right and engages with the toothed face of the bevel pinion 20 and disconnects the driven shafts 9 and 24. As the two bevel pinions 18 and 20 are in constant mesh with the idler bevel gear 22, clockwise rotation of the driven shaft 9 will convert it to anti-clockwise rotation of the driven shaft 24 at the same speed and power transmitted from the driven shaft 9 to the driven shaft 24 through bevel pinion 18, bevel gear 22 and bevel pinion 20 respectively. On starting an automobile or a machine with reverse gear in engagement, the first gear is instantly engaged due to high starting torque required on the shaft 24. As the reverse motion increases, the first gear changes automatically to second and then to top. Thus, the automatic gear, as described, is equally applicable for forward or reverse motion.

What I claim is:

1. An automatic gear mechanism comprising a driving shaft connected to an engine, an axially slidable intermediate shaft, a pinion fixed on the driving shaft in gear connection with a pinion having an internal thread in mesh with an external thread on one end of the axially slidable intermediate shaft, a helical spring mounted on the other end of the said intermediate shaft, a driven shaft, a set of varying diameter pinions fixedly mounted on the driven shaft, a set of gradually varying diameter pinions loosely mounted on the said intermediate shaft and in constant mesh with the first-mentioned varying diameter pinions, spring loaded depressible keys mounted in a slot of the intermediate shaft by corresponding keyways in hubs of the said loosely mounted pinions, the loosely mounted pinions being selectively locked to the axially slidable intermediate shaft by engaging the spring loaded depressible keys, and gearing to connect the said driven shaft to a machine for transmission of power from the engine.

2. An automatic gear mechanism according to claim 1, in which the spring for the depressible keys is in the form of a circular strip spring with the keys having semi-circular outer faces in engagement with similar keyways in the hubs of the said loosely mounted pinions.

References Cited by the Examiner
UNITED STATES PATENTS

| | | | |
|---|---|---|---|
| 1,979,080 | 10/34 | Roeder | 74–337 |
| 2,117,654 | 5/38 | Cotanch | 74–375 |

FOREIGN PATENTS 753,446  10/33  France.

DON A. WAITE, *Primary Examiner.*